July 1, 1941.  G. D. DE VENEL  2,247,749
STABILIZING DEVICE FOR TERRESTRIAL VEHICLES
Filed Jan. 29, 1938  5 Sheets-Sheet 2
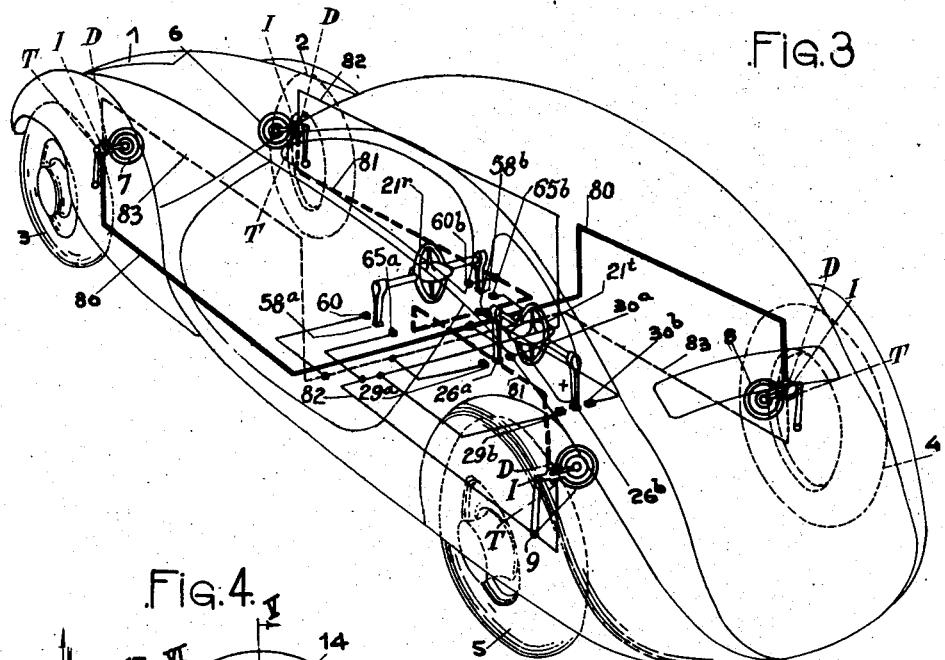
Fig. 3
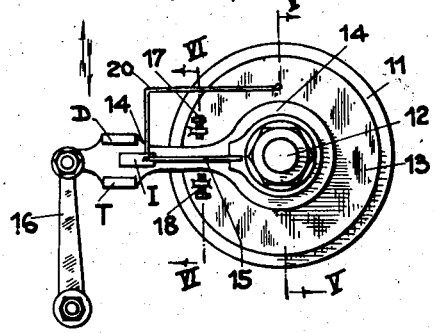
Fig. 4
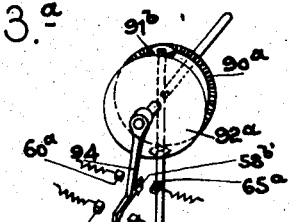
Fig. 3.ª
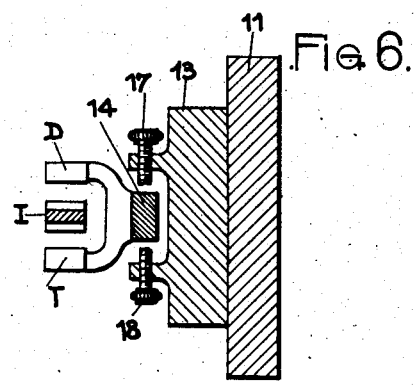
Fig. 6
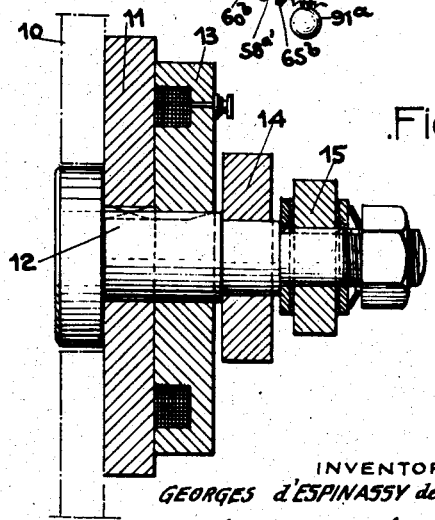
Fig. 5
INVENTOR
GEORGES d'ESPINASSY de VENEL
By: Haseltine, Lake & Co.
ATTORNEYS July 1, 1941.   G. D. DE VENEL   2,247,749
STABILIZING DEVICE FOR TERRESTRIAL VEHICLES
Filed Jan. 29, 1938   5 Sheets-Sheet 3
Fig.7.
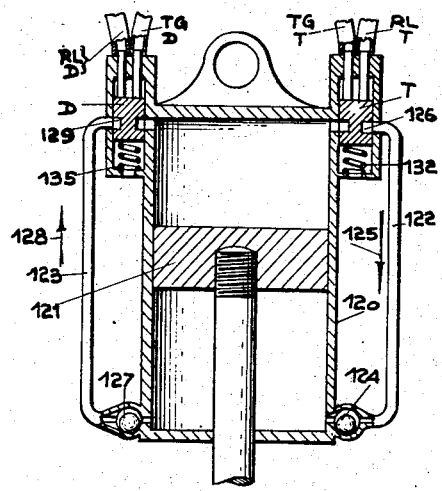
Fig.7ª.
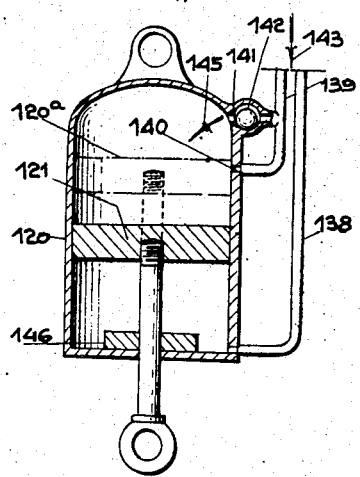
INVENTOR
GEORGES d'ESPINASSY de VENEL
By: Haseltine, Lake & Co.
ATTORNEYS.

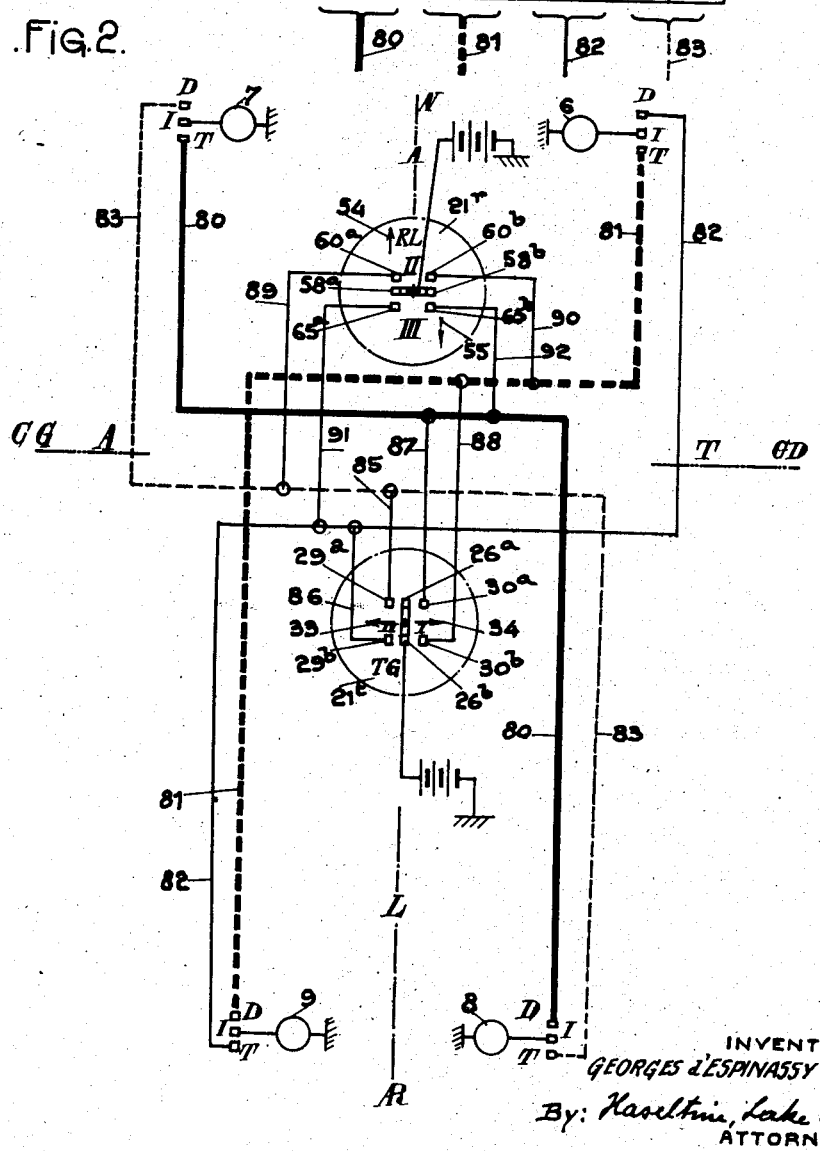

July 1, 1941.   G. D. DE VENEL   2,247,749
STABILIZING DEVICE FOR TERRESTRIAL VEHICLES
Filed Jan. 29, 1938   5 Sheets-Sheet 5

INVENTOR
GEORGES d'ESPINASSY de VENEL

By: Haseltine, Lake & Co.
ATTORNEYS

Patented July 1, 1941

2,247,749

UNITED STATES PATENT OFFICE 2,247,749

STABILIZING DEVICE FOR TERRESTRIAL VEHICLES

Georges d'Espinassy de Venel, Signes, France

Application January 29, 1938, Serial No. 187,732
In France February 4, 1937

6 Claims. (Cl. 280—124)

The present invention relates to the stabilizing devices for terrestrial vehicles.

It has already been proposed, in terrestrial vehicles to arrange between the chassis and the carrying or steering members such as the wheels or caterpillars, for instance, double-acting means or caterpillars, for instance, double-acting means which are antagonistic to the incident accelerations the direction of which differs from that of the propulsion, these means being controlled by devices detecting some at least of said accelerations.

A first object of the invention, in view of ensuring perfect stabilization, is characterised by the fact that the control of the effects produced by the double-acting antagonistic means is independent of the characteristic features of the relative movements of the chassis and the carrying members.

Other objects of the invention will appear from the following text with reference to the accompanying drawings, given by way of example only, in which:

Fig. 1 is an explanatory table relating to stabilization, pitching and rolling.

Fig. 2 is an electric diagram of an assembly for the stabilization both of pitching and of rolling.

Fig. 3 shows such an assembly on a motor vehicle.

Fig. 3a is a detail of a corrector for turning.

Fig. 4 is an elevation of an electromagnetic shock absorber provided with a pre-selector, this shock absorber being shown diagrammatically in Figs. 2 and 3.

Figs. 5 and 6 are sections, on an enlarged scale, made respectively on lines V—V and VI—VI of Fig. 4.

Fig. 7 is a sectional elevation of a hydraulic shock absorber used in the assembly of Fig. 8.

Fig. 7a is a modification in the case of a producer of energy.

Figure 9:
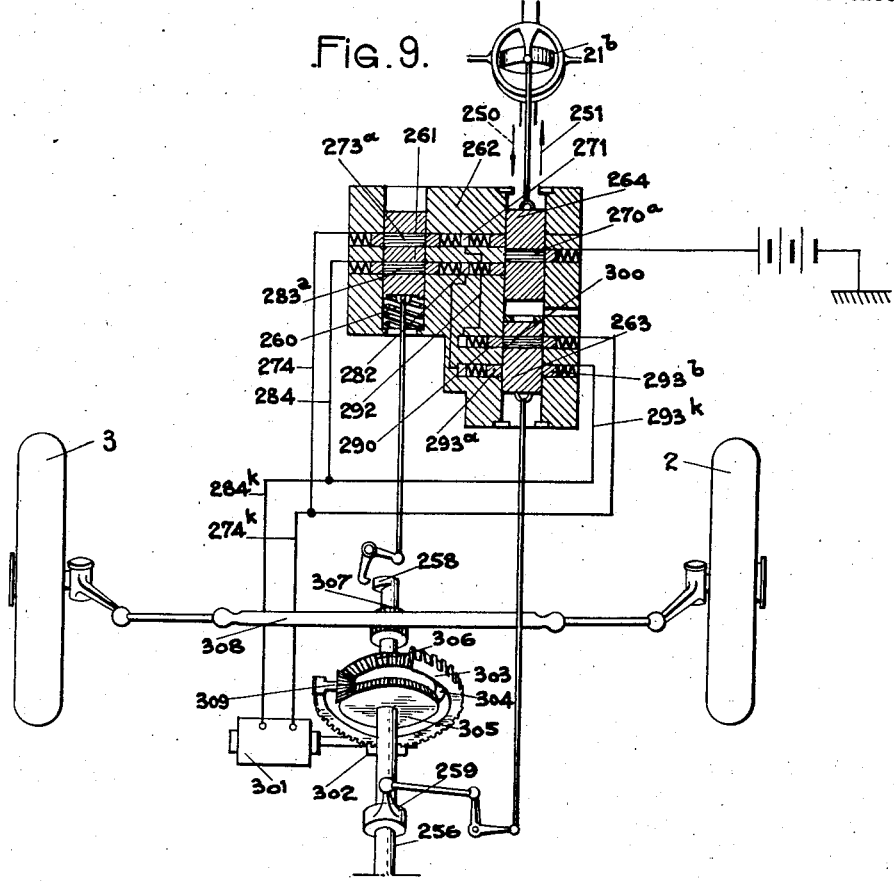

Fig. 9 diagrammatically illustrates a corrector of swaying or like movement.

Figure 10:
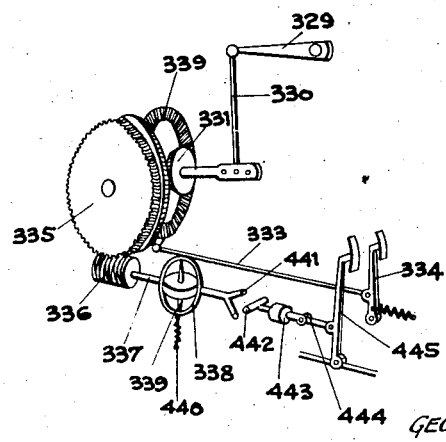

Fig. 10 diagrammatically illustrates a device for compensating pitching and eventually rolling.

In the form of construction illustrated in Fig. 3, is shown a motor vehicle provided with four wheels 2, 3, 4 and 5, shock absorbers 6, 7, 8 and 9 being interposed between the wheels and the chassis of the vehicle.

An electromagnetic shock absorber will first be described (Figs. 4, 5 and 6) which comprises a selector for the direction of rotation of this shock absorber. This selector controls the circuit of the shock absorber in view of setting it in action when this shock absorber begins a rotation in the direction prohibited by the detectors. The current is instantaneously cut off and the action of the shock absorber ceases as soon as the latter begins a rotation in the authorized direction. In fact, the arm of the shock absorber 14 driven by the connecting rod is rigid with the wheel carries two insulated contacts D and T. One receives current when the chassis tends to lift, the other receives current when the chassis tends to lower.

When the arm moves in one direction, one of its contacts engages with an intermediate contact I which is carried by the blade 15 mounted with slight friction on the fixed central shaft 12. This intermediate contact is connected by a wire 20, to an electromagnet sunk in the movable disc 13 which presses against the fixed disc in view of locking the arm 14 on this disc 11 and consequently, on the chassis 10. If one of the contacts D or T, which is supplied with current has pressed against the contact I, friction is caused between the discs 13 and 11.

If the contact D or the contact T is not supplied with current, the electromagnet is not energized, and the arm continues to freely rotate driving with it the intermediate contact.

The arm 14 of the shock absorber has a slight angular movement relatively to the friction disc 13 it actuates and of an amplitude determined by the abutments 17 and 18 which are adjustable in such a manner that the return of this arm should always be possible to an extent sufficient for cutting off the contact. A very weak spring always holds the two discs 11—13 in contact, in order that the disc 13, actuated by the arm 14, should always have a maximum delay or retardation relatively to said arm 14.

However, the electromagnetic shock absorber might be replaced by any suitable device capable of dispersing or of producing energy and provided with controls with or without relays so as to connect it to the correcting detectors adapted to control it.

In Figs. 2 and 3, the shock absorbers 6, 7, 8 and 9 each comprise contacts T, D and I, these shock absorbers operating as previously indicated.

Figs. 1 and 2 illustrate respectively an explanatory table and an assembly for a double gyroscopic control of pitching and rolling.

In the table of Fig. 1, has been indicated in the first column, the functions I, II, III and IV which correspond respectively:

Function I: to pitching TG (2nd column) with lowering of the front AV of the chassis and lifting of the rear AR, this chassis pivoting about the transverse axis AT (3rd column).

Function II: to rolling RL (2nd column) with lowering of the right side CD and lifting of the left side CG, this chassis pivoting about the longitudinal axis AL (3rd column).

Function III: to rolling RL (2nd column) with lowering of the left side CG and lifting of the right side CD, this chassis pivoting about the longitudinal axis AL (3rd column).

Function IV: to pitching TG (2nd column) with lifting of the front AV and lowering of the rear AR of the chassis which pivots about the transverse axis AT (3rd column).

At the top of the following columns, the letters T and D indicate the contacts T and D of the shock absorbers 6, 7, 8 and 9 and the groups of letters AV.G (left-hand front) AR.D (right-hand rear) AV.D (right-hand front) and AR.G (left-hand rear) show these contacts T and D on the corresponding shock absorbers.

This double entry table permits very rapidly observing the circuits which must be closed or opened in the different cases. The white circles indicate the closed electric circuits and the hatched circles the open circuits.

Thus, in the function I for pitching, it will be seen that the circuits of contacts T of the front shock absorbers are closed, as well as the circuits of the contacts D of the rear shock absorbers, the other circuits being open; these different circuits are reversed in the function IV.

In the function II for rolling, it will be seen that the circuits of contacts T of the right shock absorbers are closed as well as the circuits of contacts D of the left shock absorbers, the other circuits being open; these different circuits are reversed in the function III.

It will also be seen, in this table, that the columns indicating the control of the circuits can be grouped two by two and marked by a heavy line, heavy dotted lines, a medium line, medium dotted lines, these different lines being reproduced in the diagram of Fig. 2 for facilitating the concordance of this diagram with the table.

Reference will now be made to Fig. 2 which allows the control both of pitching and of rolling. Two gyroscopic devices $21^t$ and $21^r$ respectively comprise double contacts $26^a$ $26^b$, $29^a$ $29^b$ and $30^a$ $30^b$ for the gyroscope $21^t$ and double contacts $58^a$ $58^b$, $60^a$ $60^b$ and $65^a$ $65^b$, for the gyroscope $21^r$, the precessions of the different gyroscopes being indicated by the corresponding arrows 33, 34, 54 and 55.

In the diagram of Fig. 2, the contact T of the front left-hand shock absorber 7 is connected to the contact D of the rear right-hand shock absorber 8 by a wire 80, and the contact T of the front right-hand shock absorber 6 is connected to the contact D of the rear left-hand shock absorber 9 by a wire 81. Likewise, the contact T of the rear left-hand shock absorber 9 is connected to the contact D of the front right-hand shock absorber 6 by a wire 82 and the contact T of the rear right-hand shock absorber 8 is connected to the contact D of the front left-hand shock absorber 7 by a wire 83. These different wires 80, 81, 82 and 83 are indicated in concordance below the table of Fig. 1.

The contacts $29^a$, $29^b$, $30^a$, $30^b$ are respectively connected to the wires 83, 82, 80 and 81 by wires 85, 86, 87 and 88. Likewise, the contacts $60^a$, $60^b$, $65^a$ and $65^b$ are respectively connected to wires 83, 81, 82 and 80 by wires 89, 90, 91 and 92.

All simple pitching movements, simple rolling movements or simultaneous pitching and rolling movements are immediately limited or stopped.

By way of example, and considering the function I of the table of Fig. 1, that is to say pitching, causing the lowering of the front of the chassis and the lifting of the rear of this chassis, it will be seen that the contacts T of the front shock absorbers 6 and 7 press upon the corresponding contacts I and the contacts D of the rear shock absorbers 8 and 9 press upon the corresponding contacts I.

In this pitching movement, the gyroscope $21^r$ for rolling is not subjected to any action whilst the gyroscope $21^t$ for pitching effects a precession in the direction of the arrow 34 by closing the following circuits:

Positive pole of the source of current, contacts $26^a$, $30^a$, wire 87 and wire 80 shunting on contacts T and D respectively of the shock absorbers 7 and 8, said contacts T and D being pressed upon the corresponding contacts I for closing the circuit of the shock absorbers 7 and 8.

Positive pole of the source of current, contacts $26^b$, $30^b$, wire 88 and wire 81 shunting on the contacts T and D respectively of the shock absorbers 6 and 9, said contacts T and D being pressed upon the corresponding contacts I for closing the circuits of the shock absorbers 6 and 9.

The shock absorbers will consequently be all locked in the direction necessary for instantaneously stopping the pitching movement as soon as it starts.

The same is true for the function II. Likewise, by combining functions I and II, all the shock absorbers are locked in the direction necessary for instantaneously stopping the pitching and rolling movements which start.

The assemblage of such an installation on a vehicle is more particularly illustrated in Fig. 3.

Fig. 3a diagrammatically illlustrates a form of construction of a corrector for turning which forms a part of the diagram of Figs. 2 and 3. In this Fig. 3a has been shown a pendulum $91^a$ which controls the gyration of planet wheels $91^b$ meshing with sun wheels $90^a$ and $92^a$. The sun wheel $90^a$ is kinematically connected to the steering wheel or the like and the sun wheel $92^a$ comprises an arm 94 which carries contacts $58^{a'}$ and $58^{b'}$ capable of simultaneously pressing, either on the contacts $60^a$ $60^b$, or on the contacts $65^a$ $65^b$ according as a turning is taken to the left or to the right. These contacts $60^a$ $60^b$—$65^a$ $65^b$ are constituted by the contacts $60^a$ $60^b$ $65^a$ $65^b$ of Figs. 2 or 3. The contacts can be resiliently mounted or the arm 94 can be so mounted as not to check the steering. In practice, the contacts $60^a$ $60^b$, $65^a$ $65^b$ are constituted by rheostats indicated as following these contacts (Fig. 3a). The contacts $58^{a'}$ $58^{b'}$ rub on these rheostats for controlling the value of the electric circuit which acts during the turning period on the shock absorbers under consideration.

Fig. 7 illustrates an embodiment of a hydraulic shock absorber in which the pressure of the fluid acts on slide-valves D and T through the medium of small pistons RLD, TGD, TGT and RLT. These small pistons are actuated independently from each other by the independent circuits of a fluid under pressure.

The device illustrated in Fig. 7 comprises a cylinder 120 rigid with the chassis and a piston 121 connected to the corresponding wheel. The top and bottom portions of the cylinder are connected by conduits 122 and 123 which comprise:

The conduit 122, a ball 124 allowing the displacement of the fluid only in the direction of the arrow 125 and a slide-valve T ensuring, through a channel 126 the passage of the fluid when it is in the position shown in the drawings.

The conduit 123, a ball 127 allowing the displacement of the fluid only in the direction of the arrow 128 and a slide-valve D ensuring, through a channel 129, the passage of the fluid when it is in the position shown in the drawings.

If there is no detection of any interfering acceleration on board the chassis, all the movements of the piston 121, rigid with the wheel, are free and unrestrictive when the piston rises, due to the provision of the channel 126 and the ball 124, and when the piston lowers, by means of the ball 127 and the channel 129. If there is detection of an interfering acceleration, with lowering of the chassis at the place where the cylinder is secured in position, the channel 126 closes under the action of one or of both small pistons TGT-RLT, connected to the detectors, and totally or partially prevents the descent of the cylinder whilst allowing the desirable free rising of said cylinder and, consequently, of the chassis at this point. Reversely, if there is detection with lifting of the chassis, the channel 129 closes under the action of one or of both small pistons RLD—TGD and totally or partially prevents the rising of the cylinder whilst allowing the desirable free descent of the same.

Figure 8:
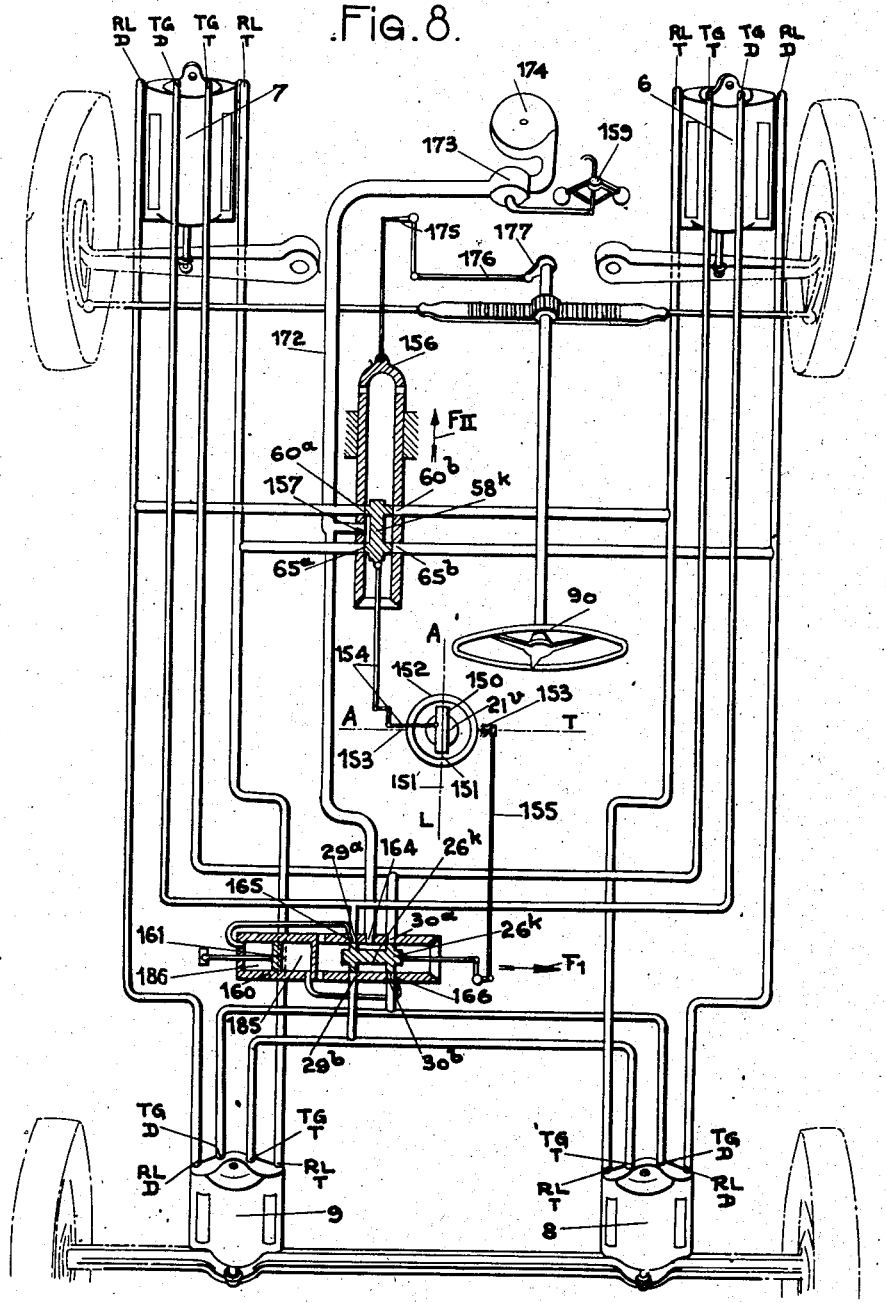
Fig. 8 is a general view of a hydraulic or like installation on board a vehicle.

Fig. 8 shows an installation, on board a vehicle on which use is made of shock absorbers of the type shown in Fig. 7.

Before describing this Fig. 8, an embodiment of a device for producing energy will be described with reference to Fig. 7a. This device comprises a cylinder 120 rigid with the chassis and in which moves a piston 121 rigid with the wheel. A conduit 138 opens at the lower part of the cylinder and a conduit 139 opens, at 140, a branch pipe 141 controlled by a ball 142 opening in the upper part of this cylinder.

The admission of the fluid under pressure in the conduits 138 and 139, in the direction of the arrow 143, is controlled by the detecting devices. If there is no detection of an interfering acceleration on board the chassis, all the movements of the piston 121 rigid with the wheel, are possible, during ascent and descent.

If there is detection of an acceleration with lowering of the chassis at the point where the cylinder 120 is secured in position, the detecting device acts immediately to permit the admission of a fluid under pressure to the conduit 139 and, consequently, in the upper part of the cylinder in view of the lifting of this cylinder and, consequently, of the chassis at this point. Likewise, if there is detection of an acceleration with lifting of the chassis at the point where the cylinder 120 is secured in position, the detecting device acts immediately to permit the admission of a fluid under pressure in the conduit 138, this immediately causing the lowering of the cylinder 120 and, consequently, of the chassis at this point.

In the case where the piston would reach the maximum high position 120ᵃ illustrated in dot and dash lines in the drawings, the opening 140 of the conduit 138 would be obturated, but for trapping a volume of fluid in the upper part of the cylinder in view of limiting the displacement of the piston.

In the embodiments without other suspension, the air trapped at the upper part of the cylinder allows of supporting the vehicle. However, when the piston is in the position 120ᵃ, it is possible to admit the fluid under pressure in the upper part of the cylinder through the branch pipe 141 which permits the flow of this fluid only in the direction of the arrow 145, owing to the ball 142.

The downward displacement of the piston 121 is limited by a resilient ring 146 made of rubber for example.

The admission of the fluid in the conduits 138 and 139 can be controlled by independent cocks actuated by the detecting devices. Use can also be made of a common multi-way cock or of a common slide-valve having several passages.

The installation of Fig. 8 will now be described, in which use is made for the control of pitching and rolling, of a gyroscopic device, the gyroscope wheel 21ᵛ of which indicates a fixed reference mark in space or the true vertical. For instance, this gyroscopic wheel which can be combined with a counter-weight or its equivalent, unresponsive to the action of centrifugal force, is journalled in a frame 150 which can be substantially vertical and which is journalled, through the medium of a pin 151 in a frame 152 which can be substantially horizontal journalled about a pin 153 arranged parallel to the transverse axis of the vehicle, this axis being at right angles to the pin 151.

The frame 150 is kinematically connected, through a system 154, to a slide-valve 58ᵏ controlling the rolling and the frame 152 is kinematically connected, through a system 155, to a slide-valve 26ᵏ controlling the pitching.

The slide-valve 58ᵏ moves in a cylinder 156 provided with ports 60ᵃ, 60ᵇ, 65ᵃ, 65ᵇ and 157 and which can be moved in translation in function of the direction of the steering wheel 90.

The slide-valve 26ᵏ moves in a cylinder 160, a piston 161 being rigid with the chassis of the vehicle.

The cylinder 160 comprises ports 29ᵃ, 30ᵃ, 29ᵇ, 30ᵇ as well as ports 164, 165 and 166.

It will be noted that the ports 60ᵃ, 60ᵇ, 65ᵃ and 65ᵇ, on the one hand, controlled by the piston 58ᵏ, and the ports 29ᵃ, 29ᵇ, 30ᵃ and 30ᵇ, on the other hand, controlled by the piston 26ᵏ correspond, as regards the principle of operation, to the contacts 60ᵃ, 60ᵇ, 65ᵃ, 65ᵇ controlled by the contacts 58ᵃ—58ᵇ and 29ᵃ, 29ᵇ, 30ᵃ, 30ᵇ controlled by the contacts 26ᵃ, 26ᵇ, as illustrated in Fig. 2.

The ports 157 and 164 are connected by the conduit 172 to a distributor 173 connected to a source 174 of a fluid under pressure. The distributor 173 is moved in function of the speed (system 159) and the position of the cylinder 156 in function of the direction of the steering wheel 90. In fact, the cylinder 156 is pivoted on a bell crank lever 175 moved by a link 176 connected to a crank 177 rigid with the direction rod or steering wheel shaft 90.

In the case of rolling in one direction or the other, the slide-valve 58ᵏ moves in the cylinder 156 for putting in communication with the source of pressure, either the ports 60ᵃ, 60ᵇ or the ports 65ᵃ, 65ᵇ, this causing an admission of the fluid either to the right-hand shock absorbers, or to the left-hand shock absorbers in view of transmitting the pressure to said shock absorbers for acting in the reverse direction to that according to which the rolling tends to take place or simply for locking the shock absorbers in view of preventing any rolling movement.

Likewise, pitching in one direction or the other causes a displacement of the slide-valve 26$^k$ in the cylinder 160 for uncovering, either the ports 29$^a$, 29$^b$, or the ports 30$^a$, 30$^b$ for causing either an action reverse to that resulting from the pitching, or the locking of the shock absorbers for preventing any pitching movement. Moreover, the displacement of the slide-valve 26$^k$ also causes the admission of the fluid either in the chamber 185, or in the chamber 186, of the cylinder in view of replacing the cylinder in a position relatively to the slide-valve 26$^k$ which is just sufficient for maintaining the admission at 29$^a$, 29$^b$ or 30$^a$, 30$^b$, so that, in case the direction of the pitching should be reversed, the reversal of the admission should be instantaneously effected.

It will also be noted that the cylinder 156 occupies in a straight line, a definite position which corresponds to the closing of the ports 60$^a$, 60$^b$, 65$^a$, 65$^b$, when the vehicle has its transverse axis disposed normally in a horizontal position as desired. Any departure from this position opens a group of two ports which close again only when the effect of the admission will have restored the transverse axis to the predetermined position, preferably the horizontal position.

When passing over or around a curve, the steering causes a movement of translation of the cylinder 156 parallel to the axis of the slide-valve 58$^k$ and in the direction necessary for effecting a false rolling, the ports being uncovered proportionally to the deflexion or changing of direction of the steering wheels. If use is made of energy producers, a lowering of the chassis is caused towards the inside of the turning and a lifting of the chassis towards the outside.

By way of illustration, the operation will be described in the case of functions I and II (table of Fig. 1), that is to say pitching with lowering of the front and lifting of the rear and rolling with lowering of the right-hand side and lifting of the left-hand side of the chassis.

It will be noted that the cylinder 160 is movable, the piston 161 being fixed.

The pitching movement causes a displacement of the slide-valve 26$^k$ in the direction of the arrow FI so that the ports 30$^a$ and 30$^b$ are put in communication with the source of pressure 174 for acting on TGT of 7 and TGT of 6 and on TGD of 8 and TGD of 9, so that any pitching movement is prevented.

The rolling movement causes a displacement of the slide-valve 58$^k$ in the direction of the arrow FII so that the ports 60$^a$ and 60$^b$ are put in communication with the source of pressure 174 for acting on RLT of 8 and RLD of 7 and on RLT of 6 and RLD of 9, so that any rolling movement is prevented.

Fig. 9 illustrates a form of construction of a gyroscopic control for the steering, this control allowing of correcting swaying movements, or more generally, any change in direction which is not controlled.

The gyroscopic device is constituted by a gyroscope 21$^b$ the axis of rotation of which is substantially parallel to the longitudinal axis of the vehicle and which is carried in a frame which pivots on an axis at right angles to the longitudinal axis. The direction of rotation is such that any swerve to the right causes a precession in the direction of the arrow 251, and any swerve to the left, a precession in the direction of the arrow 250. Two springs restore the gyroscope to the position of equilibrium when it has terminated a precession and the passage of current to the contacts 271—282 is cut off.

In this installation, the front wheels or carrying members 2 and 3 of the vehicle are connected to a rack 308. An energy producer such as an electric motor 301 controls, through the medium of a worm 302, a worm wheel 303 which carries radial arms for planet wheels 304 interposed between sun wheels 305 and 306. The sun wheel 305 is rigid with the controlling rod 256 of the steering gear and the sun wheel 306 controls, through the medium of a toothed wheel 307, the rack 308 connected to the front wheels of the vehicle. In this embodiment, the electric motor is reversible and allows steering control in one direction or in the other. On the control rod 256 is frictionally mounted an arm 259.

A cam 258, rigid with the pinion 307 is designed to function in opposition to the action of a spring 260, on a slide-valve 261 carrying two contacts 273$^a$ and 283$^a$, by reason of the engagement of said cam with a bell crank lever at the lower end of the rod connected to said slide valve 261, as seen in Fig. 9. This slide-valve is movable in translation in a corresponding bore formed in a member 262. The arm 259, mounted with slight friction on the steering rod controls the displacement in translation of a slide-valve 263 carrying a contact 300. This slide-valve is movable in translation between two abutments in a corresponding bore of member 262. Moreover, in this same bore can move another slide-valve 264 carrying a contact 270$^a$. This slide-valve is controlled in translation by the gyroscopic system. The various slide-valves control the different electric circuits or other power transmission system as illustrated in the drawings, the power, for instance electric energy, being supplied from a suitable source.

In the case of an accidental swerve to the right, when the vehicle moves rectilinearly, the gyroscopic system effects a precession in the direction of the arrow 251 and drives the slide-valve in this direction.

An electric circuit of the motor 301 is thus closed through the electric contact 270$^a$ then through contact 271, contact 273$^a$ and wires 274 and 274$^k$. The motor rotates in the suitable direction for causing a deflexion of the wheels towards the left, in view of avoiding swaying movements. When the swaying movement is stopped by this action on the steering, the gyroscopic system is restored to its mean position and the circuit previously indicated is cut off.

For a swerve towards the left, the gyroscopic system effects a precession in the direction of the arrow 250 and the slide-valve 264 also moves in the direction of this arrow 250 by causing the closing of the circuit of motor 301 through the contacts 270, 282, 283$^a$ and wires 284 and 284$^k$. The motor rotates in the suitable direction for causing a deflexion of the wheels towards the right for the purpose indicated.

Taking the example of a turn towards the right, the action of the steering wheel causes the withdrawal of cam 258 rigid with pinion 307, the slide-valve 261 moving in the direction of the arrow 251, this cutting off the circuits at 273$^a$ and 283$^a$. On the other hand, the arm 259 mounted with slight friction on the steering rod follows the movement of this rod until the contact 300 of slide-valve 263 is brought opposite contacts 293$^a$ and 293$^b$.

The gyroscope under the effect of the beginning of the turn effects a precession in the direction of a swerve to the right, consequently in the direction of the arrow 251. The slide-valve 264 closes the circuit at 271 but the wire 292 does not allow the current to pass as it is connected to contact 290 which is insulated at this moment, as the slide-valve 263 has moved in the direction of the arrow 250 under the action of the steering wheel.

Therefore, there is no effect of pressure on the steering wheels, the steering being direct between the wheels and hand wheel. Should skidding occur in such manner that, in the turn to the right, a swerve to the left should begin, the gyroscope at once effects a precession in the direction of the arrow 250 closing the circuit of the motor through contacts 293ª, 300, 293ᵇ, wires 293ᵏ and 294ᵏ, for taking up the swerve.

When the turn is terminated, the steering comes back to zero restoring the arm 259 and the slide-valve 263 to their initial positions. The gyroscope has a precession force which diminishes progressively as the turning movement towards the right diminishes, the returning springs restoring it to the position in which the slide-valve 264 cuts off the various circuits. Cam 258 restores the contacts of the slide-valve 261 to their initial positions as soon as the wheels have no deflexion. If after the turn to the right a swerve occurs, everything is ready to check the same as soon as the gyroscope effects a precession according to 250 or 251.

The electric motor 301 can be replaced by any driving means capable of having the same energy producing function and particularly, by a turbine or the like. The slide-valves provided with contacts are replaced by balanced gates.

Fig. 10 is an example of stabilization during pitching by variation of the distribution of the bodies on the suspended part, due to increases or diminutions of the speed of propulsion.

The control arm 329 of the butterfly valve of the carburettor is rigid through a connecting rod 330 with a planet wheel 331 of a differential system, a sun wheel 332 of which is rigid through a connecting rod 333 of the pedal of the accelerator 334 and the second sun wheel 335 of which carries a supplementary gear wheel meshing with a worm 336 rigid with a spindle 337 parallel to the longitudinal axis of the vehicle, and itself rigid with the casing 338 of a detecting gyroscope, the wheel of which, supplied with electric current, rotates about the axis 339 at right angles to the longitudinal and transverse axes of the vehicle. A calibrated spring 440 restores the gyroscope to the position of equilibrium. The extension of shaft 337 carries a muffler 441 which can receive a member 442 sliding in a (fixed) bearing 443 and rigid through a connecting rod 444 with the brake pedal 445. The operation of the device is the following: When there is no interfering acceleration, the supply to the motor is determined by the position of the pedal of the accelerator 334, connecting rod 333, sun wheel 332, planet wheel 331, connecting rod 330 and the arm of the butterfly valve 329. When pitching occurs the precession of the detecting gyroscope more or less overcomes the resistance of the calibrated spring 440 and produces the rotation of shaft 337, worm 336, toothed wheel and sun wheel 335 and causes, through the planet wheel 331 an additional or subtractive effect on the butterfly valve of the carburettor. An increase of the power of the motor causes unload at the front and overload at the rear, a diminution of power of the motor determines a reverse effect. If the brake pedal 445 is acted upon, the effect of the detecting gyroscope on the valve of the carburettor is neutralized through the medium of the muffler.

The butterfly valve of the carburettor has been taken only by way of example and any other member or group of members can be acted upon which is capable of increasing or reducing the speed of propulsion, particularly the ignition, advanced ignition, the brake.

Stabilization can also be obtained by gyroscopic reactions.

What I claim as my invention and desire to secure by Letters Patent is:

1. A terrestrial vehicle comprising wheels, a chassis, means for detecting pitching accelerations, means for detecting rolling accelerations, double-acting stabilizing means interposed between the wheels and the chassis, electric means for controlling said stabilizing means comprising a switch respectively associated with each stabilizer and arranged to be actuated by the relative movement of the chassis and the corresponding wheel, a switch actuated by the means detecting pitching accelerations, a switch actuated by the means detecting rolling accelerations, the control means being so arranged that the stabilizing means produce no effect when no interfering acceleration is detected.

2. A terrestrial vehicle comprising wheels, a chassis, means for detecting pitching accelerations, means for detecting rolling accelerations, stabilizing means respectively interposed between each wheel and the chassis, said stabilizing means comprising two members adapted to come into frictional contact, means for connecting one of these members to the chassis and the other to the wheel, and an electric winding adapted to press the two members one against the other, when it is energized, a source of electric energy, one pole of which is connected to one of the ends of said winding, a switch actuated by the relative movement of the wheel and the chassis and arranged for connecting the second end of said winding to one or the other of two contacts, according to the direction of this movement; means for connecting these two contacts to the second pole of the source of electric energy, said latter means comprising two switches, one of which is arranged to be actuated by the detector of pitching accelerations, and the other is arranged to be actuated by the detector of rolling accelerations.

3. A terrestrial vehicle comprising wheels, a chassis, means for detecting pitching accelerations, means for detecting rolling accelerations, stabilizing means respectively interposed between each wheel and the chassis, said stabilizing means comprising two members adapted to come into frictional contact, means for connecting one of these members to the chassis and the other to the wheel, and an electric winding adapted to press the two members one against the other, when it is energized, a source of electric energy, one pole of which is connected to one of the ends of said winding, a switch actuated by the relative movement of the wheel and the chassis and arranged for connecting the second end of said winding to one or the other of two contacts, according to the direction of this movement, electric wires connecting each of these contacts to the corresponding contact of the diagonally opposed switch; and means for connecting each of these wires to the second pole of the source of electric ennergy, said latter means comprising two switches, one of which is arranged to be actuated by the detector of pitching accelerations, and the other is arranged to be actuated by the detector of rolling accelerations.

4. A terrestrial vehicle comprising wheels, a chassis, means for detecting rolling accelerations, steering means, double-acting stabilizing means interposed between the wheels and the chassis and each comprising a cylinder and a piston, a source of fluid under pressure, a distributor for controlling the supply of fluid under pressure to the stabilizers, this distributor comprising elements movable relatively to each other, means for connecting one of these elements to the detector of rolling accelerations, means for connecting the other one of these elements to the steering means.

5. In a ground vehicle comprising front and rear wheels and a chassis with double acting stabilizing means interposed between said wheels and said chassis, the combination of gyroscopic means mounted on the chassis and comprising an aperiodic element, and means responsive to the displacements of the chassis relative to said element adapted to control said stabilizing means.

6. In a ground vehicle comprising front and rear wheels, a chassis and steering means, the combination of gyroscopic means mounted on the chassis and comprising an aperiodic element, means responsive to displacements of the chassis relative to said element, double-acting stabilizing means interposed between said wheels and the chassis and comprising a cylinder and a piston, a source of fluid under pressure, distributers for controlling the admission of the fluid under pressure to said stabilizers, one of said distributers controlling rolling of the vehicle and comprising two elements movable relatively to each other, means for connecting one of said elements to the means that are sensitive to the relative displacements of the chassis with respect to said aperiodic element, means for connecting the other of said elements to the steering means, the other of said distributers being adapted to control the pitching of the vehicle and comprising two elements movable relatively to each other, means for connecting one of said latter elements to the means that are sensitive to the relative displacements of the chassis with respect to said aperiodic element and means for rendering the other element sensitive to the pressure of the fluid transmitted to the stabilizers in such a manner that stabilization takes place under the same conditions whatever may be the longitudinal inclination of the rolling plane of the vehicle.

GEORGES D'ESPINASSY DE VENEL.